United States Patent [19]

Resare

[11] 4,068,742

[45] Jan. 17, 1978

[54] VIBRATION DAMPER FOR IMPACT TOOL

[75] Inventor: Nils Carl Hakan Resare, Ektorp, Sweden

[73] Assignee: Atlas Copco Aktiebolag, Nacka, Sweden

[21] Appl. No.: 725,564

[22] Filed: Sept. 22, 1976

[30] Foreign Application Priority Data

Feb. 4, 1976 Sweden ................................ 7601167

[51] Int. Cl.[2] .......................... F16F 9/10; B25D 17/12

[52] U.S. Cl. ...................................... 188/1 B; 181/230

[58] Field of Search ........................... 74/574; 188/1 B; 408/143; 181/33 A, 33 C, 33 G

[56] References Cited

U.S. PATENT DOCUMENTS

| | | | |
|---|---|---|---|
| 1,615,468 | 1/1927 | McDonald | 188/1 B |
| 2,195,041 | 3/1940 | Von Schlippe | 188/1 B X |
| 2,375,818 | 5/1945 | Peters | 188/1 B X |
| 2,606,366 | 8/1952 | Stevens | 408/143 UX |
| 3,061,039 | 10/1962 | Peters | 188/1 B X |
| 3,141,523 | 7/1964 | Dickie | 188/1 B |
| 3,415,470 | 12/1968 | Woodford et al. | 188/1 B X |
| 3,653,625 | 4/1972 | Plice | 188/1 B UX |
| 3,848,931 | 11/1974 | Swisher | 188/1 B X |

*Primary Examiner*—Duane A. Reger
*Attorney, Agent, or Firm*—Flynn & Frishauf

[57] ABSTRACT

An impact tool has a vibration damper which vibration damper comprises an envelope which surrounds a working part of the tool and thereby encloses a liquid-like material having damping properties. The liquid-like material is enclosed in a bag for easier handling.

16 Claims, 7 Drawing Figures

VIBRATION DAMPER FOR IMPACT TOOL

The present invention relates to impact tools comprising a vibration damper for damping lateral vibrations of a working part of the tool. Examples of such tools are breakers for breaking up concrete pavements and the like, spades and chisels of different kinds and drill rods for rock drilling.

A tool of the above mentioned kind is designed to transfer considerable impact energies in its longitudinal direction from an impact machine, to which the tool is connected, to the material being worked. In order to damp the emission of sound from the tool, caused by lateral vibrations of the tool, one has earlier used either sleeves of rubber or plastic surrounding the tool or channels in the tool filled with damping material e.g. certain metal alloys or sand.

SUMMARY OF THE INVENTION

According to the present invention the vibration damper comprises an envelope which surrounds the working part of the tool, preferably along a shorter part of its length, and encloses a liquid-like material. The envelope encloses a bag containing the liquid-like material. Liquid-like material hereby refers to a liquid with or without admixtures. A liquid is hereby defined as a body having an indefninite form but a definite volume. As examples of suitable liquid-like materials one could mention unvulcanized silicon rubber, silicon grease, oils and other liquids containing dispersed or dissolved polymeric material or dispersed solid material e.g. iron powder.

By means of the present invention a more even distribution of heat is obtained in the damper than in rubber or plastic dampers, which results in a lower temperature and thereby a longer service life. The rubber material in rubber dampers often reaches such a high local temperature that it is broken down. A tool according to the present invention is considerably cheaper in manufacture than those tools which are provided with internal channels filled with damping material.

According to a preferred embodiment of the invention the liquid-like material in the vibration damper comprises a liquid which hardens when in contact with oxygen or humid air. The vibration damper is in this way made self-sealing.

DETAILED DESCRIPTION

Figure 1:
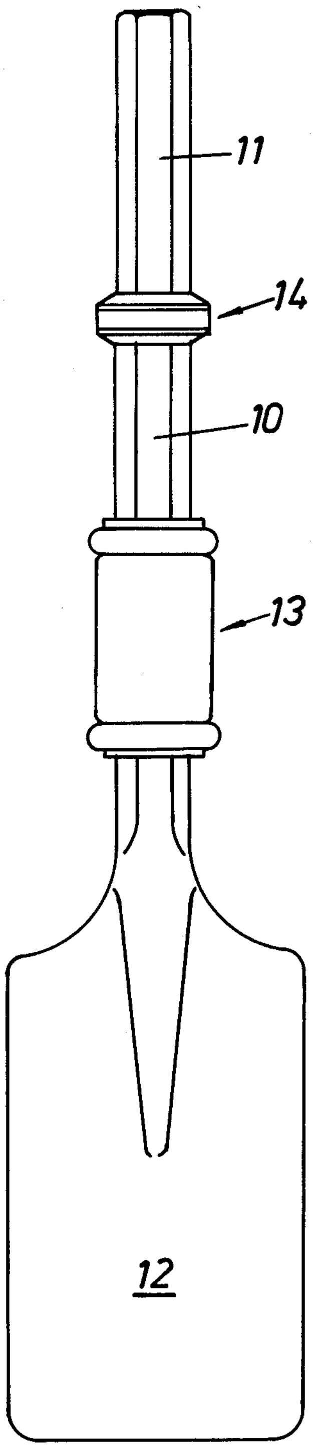
FIG. 1 shows an embodiment of the invention.
Figure 2:
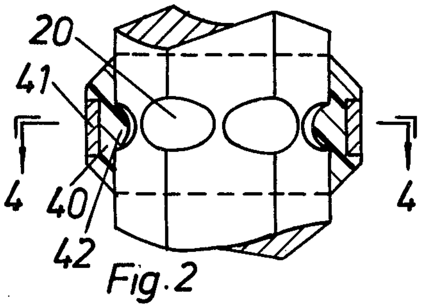
FIG. 2 shows a part of the tool according to FIG. 1 comprising a detachable collar.
Figure 4:
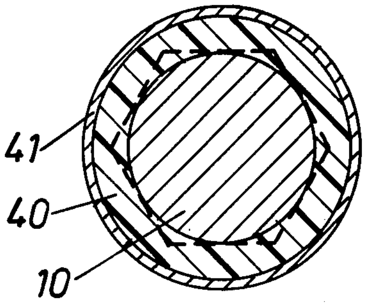
FIG. 4 shows a section along the line 4—4 in FIG. 2.
Figure 3:
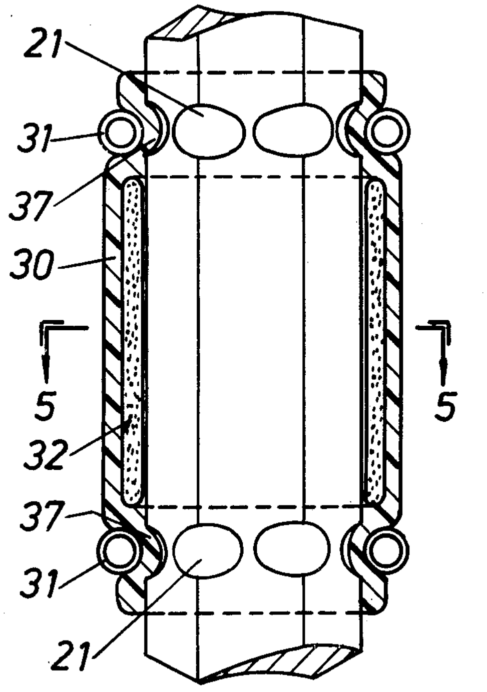
FIG. 3 shows another part of the tool of FIG. 1 comprising the vibration damper.
Figure 5:
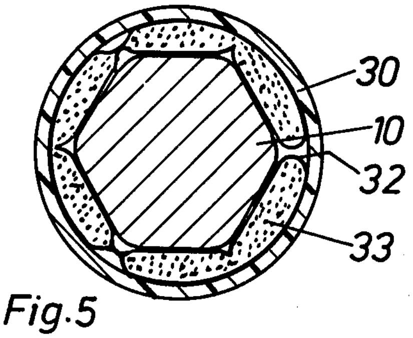
FIG. 5 shows a section along the line 5—5 in FIG. 3.

The tool according to FIG. 1 comprises a working part 10 which is surrounded by a vibration damper 13 shown in greater detail in FIG. 3. The working part comprises a shank 11 meant to be put into a (not shown) impact machine and a working end 12 in form of a spade. The tool is furthermore provided with a collar 14, shown in greater detail in FIG. 2, for restricting the movement of the tool into the machine. The detachable collar according to FIGS. 2 and 4 comprises an elastic body 40 provided with an annular round 42 and a metal ring 41 or spring. By means of the round 42 the collar 14 is locked to cut-outs 20 in the tool by means of snap action when the collar is pushed onto the tool. The ring 41 guarantees that the collar is kept steadily in place. The vibration damper according to FIGS. 3 and 5 comprises an envelope 30 of elastic material which at its ends is provided with annular rounds 37. By means of these rounds and rings or springs 31 the envelope 30 is locked to cut-outs 21 in the tool as described above in connection with the collar 14. A bag 32, shown more in detail in FIGS. 6 and 7, containing a liquid-like material 33 is situated between the envelope 30 and the working part 10 of the tool. As is shown in FIG. 1 the damper 13 surrounds the working part 10 only along a part of its length.

Figure 7:
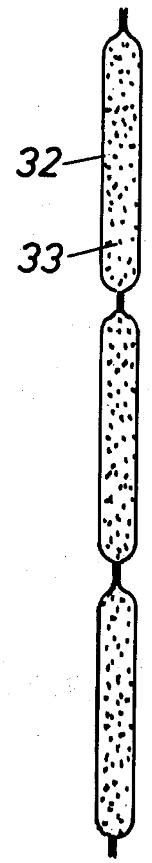
FIG. 7 shows a section according to 7—7 in FIG. 6.
Figure 6:
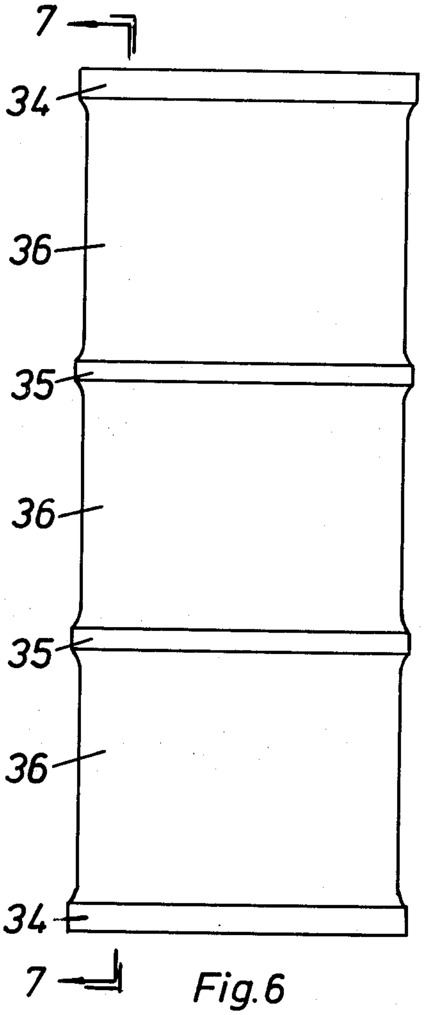
FIG. 6 shows a bag containing a liquid-like material.

The bag 32 shown in FIGS. 6 and 7 is made from a plastic hole-like structure which by means of weldings 34 has been closed at the ends. The bag 32 has furthermore been divided into three sections 36 by means of weldings 35, through which an even distribution of the liquid-like material 33 around the working part 10 of the tool is guaranteed. The manufacture of the bags can easily be automated if two foils are used as initial material. These are then welded together along the sides so that a hose-like structure is formed immediately below the filling place. The filled hose is then provided with transverse weldings as shown in FIGS. 6 and 7. The hose is then cut into suitable lengths. The bag is shown in the drawing as divided into three sections but can of course have another number of sections.

In case the damper 13 is to be used for damping the sound of drill rods or other tools which penetrate into the material being worked the ends of the enevelope 30 can be made bevelled in order to decrease the wear. The vibration damper could also be made such that it surrounds the main part of the working part of the tool.

The sleeve 30 shown in FIG. 3 is made of plastic but can of course be made of another material since its purpose is to enclose and protect the bag 32 in which the vibrations are damped because of the internal work.

The above described and in the drawings shown embodiments of the invention are only to be regarded as examples which can be modified within the scope of the subsequent claims.

What is claimed is:

1. In an impact tool comprising an elongated working part (10) which includes a shank portion (11) for connection to an impact machine, a working end (12) and a collar (14) intermediate said shank portion (11) and working end (12), said impact tool transmitting impact energy in its axial direction,
   - a vibration damper for damping lateral vibrations is said impact tool, comprising:
   - an envelope (30) surrounding a portion of the working part of the tool intermediate said collar and working end;
   - a liquid-like material (33) enclosed within said envelope for damping lateral vibrations of said working part; and
   - bag means (32) situated between said envelope and said working part and containing said liquid-like material within said bag means.

2. A vibration damper according to claim 1 wherein said envelope comprises an elastic projection (37) projecting interiorly therefrom proximate an end portion of said envelope; said working part (10) of said impact tool comprises a cut-down portion (21) for receiving said elastic projection (37); and further comprising a ring-like member (31) surrounding said end portion of said envelope so as to push said elastic projection (37) into said cut-down portion for providing a snap action lock of said envelope to said working part.

3. A vibration damper according to claim 2 wherein said ring-like member comprises a spring.

4. A vibration damper according to claim 2 wherein said elastic projection is an annular internal projection.

5. A vibration damper according to claim 1 wherein said envelope and bag means are made of elastomeric material.

6. A vibration damper according to claim 2 wherein said envelope comprises an elastic round at its other end; and further comprising a further ring-like member surrounding said other end portion of said envelope.

7. A vibration damper according to claim 6 wherein said further ring-like member comprises a spring.

8. A vibration damper according to claim 1 wherein said bag means comprises a plurality of divided sections, each section containing said liquid-like material therein, to provide a substantially even distribution of said liquid-like material around said working part of said impact tool.

9. A vibration damper according to claim 8 wherein each of said sections surrounds an axial portion of the working part of said impact tool.

10. A vibration damper according to claim 1 wherein said envelope surrounds said working part of said tool along a shorter path of its length.

11. A vibration damper according to claim 1 wherein said liquid-like material comprises a liquid which hardens when in contact with oxygen.

12. A vibration damper according to claim 1 wherein said liquid-like material comprises a liquid which hardens when in contact with humid air.

13. In an impact tool according to claim 1, said collar comprising a detachable collar (40) of elastic material, said elastic detachable collar being provided with an elastic projection (42) projecting interiorly therefrom; said working part comprising a cut-down portion (20) for receiving said elastic projection; and further comprising a ring-like member (41) surrounding said elastic projection to push said elastic projection into said cut-down portion for providing a snap action lock of said collar to said working part.

14. In an impact tool according to claim 13, said ring-like member comprising a spring.

15. In an impact tool according to claim 13, said elastic projection (37) comprising an internal annular projection.

16. A detachable collar for an impact tool, said impact tool having a cut-down portion along the length thereof intermediate the ends thereof, said collar comprising:

a ring of elastic material having an internal annular projection which is receivable in said cut-down portion of said tool; and a metallic ring member surrounding said elastic ring in the vicinity of said internal annular projection for pushing said elastic projection into said cut-down portion of said impact tool for providing a snap action lock of said collar to said impact tool.

* * * * *

UNITED STATES PATENT AND TRADEMARK OFFICE
CERTIFICATE OF CORRECTION

PATENT NO. : 4,068,742

DATED : January 17, 1978

INVENTOR(S) : Nils Carl Hakan RESARE

It is certified that error appears in the above-identified patent and that said Letters Patent are hereby corrected as shown below:

Column 2, line 54, after "vibrations" change "is" to --in--.

Signed and Sealed this

*Ninth* Day of *May 1978*

[SEAL]

*Attest:*

RUTH C. MASON
*Attesting Officer*

LUTRELLE F. PARKER
*Acting Commissioner of Patents and Trademarks*